United States Patent [19]

Hallstrom, Jr.

[11] Patent Number: 4,856,645

[45] Date of Patent: Aug. 15, 1989

[54] RECIPROCATING CONVEYOR

[76] Inventor: Olof A. Hallstrom, Jr., 1920 Hallstrom Rd., Tillamook, Oreg. 97141

[21] Appl. No.: 262,078

[22] Filed: Oct. 24, 1988

Related U.S. Application Data

[63] Continuation of Ser. No. 110,165, Oct. 19, 1987, abandoned.

[51] Int. Cl.$^4$ .............................................. B65G 25/04
[52] U.S. Cl. .................................... 198/750; 198/774; 414/525.1
[58] Field of Search ............... 198/750, 773, 774, 775; 414/525.1, 525.9

[56] References Cited

U.S. PATENT DOCUMENTS

| | | | |
|---|---|---|---|
| 2,629,504 | 2/1953 | Peterson | 414/525.9 |
| 2,973,856 | 3/1961 | Brooks | 198/773 X |
| 3,225,905 | 12/1965 | La Belle | 198/774 |
| 3,881,595 | 5/1975 | Deve | 198/774 X |
| 4,611,708 | 9/1986 | Foster | 198/750 |

Primary Examiner—Robert J. Spar
Assistant Examiner—D. Glenn Dayoan
Attorney, Agent, or Firm—Olson & Olson

[57] ABSTRACT

A reciprocating slat type conveyor comprises a framework mounting a bed of longitudinally extending, laterally spaced apart first and second groups of alternating slats arranged for longitudinal sliding movement on the plane of the bed. Interposed between adjacent reciprocating slats is a fixed slat mounted immovably to the framework, each fixed slat having an upper material supporting surface that is narrower than the upper material supporting surface of each first and second reciprocative slat. A pair of double acting hydraulic cylinders are provided to move the groups of reciprocative slats longitudinally, one group of reciprocative slats being connected to one cylinder and the other group being connected to the second cylinder, so that adjacent reciprocative slats are able to move independently of each other while every other reciprocative slat operates in unison off the same drive, whereby all reciprocative slats can be moved in the forward direction simultaneously, and each group of reciprocative slats can be moved in the rearward, retracting direction independently of the other.

8 Claims, 1 Drawing Sheet

RECIPROCATING CONVEYOR

This application is a continuation of application Ser. No. 110,165 filed Oct. 19, 1987 now abandoned.

BACKGROUND OF THE INVENTION

This invention relates to slat type reciprocating conveyors, and more particularly to an improvement over such reciprocating conveyors typical in the art, and more specifically, an improvement in the construction and overall efficiency of my earlier reciprocating conveyor systems.

Reciprocating slat type conveyors provided heretofore generally have utilized groups of slats arranged for movement both vertically and longitudinally, or arranged for uniform movement in one longitudinal direction and sequential movement in the opposite diection. For most materials, these conveyors commonly result in a step advance of material, followed by a partial retraction of material as the retraction of the slats occurs during that phase of operation. Accordingly, these arrangements have been found to be slow, and wasteful of time and drive power.

My earlier reciprocating conveyors disclosed in U.S. Pat. Nos. 3,534,875 and 4,143,760 overcame the disadvantages and limitations of earlier slat type reciprocating conveyors. However, I have discovered that my earlier constructions involve structural features that are not always necessary in all types of conveyor needs, and are therefore less efficient in certain conveying applications.

SUMMARY OF THE INVENTION

In its basic concept, this invention provides a slat type reciprocating conveyor system formed with first alternating, laterally spaced, longitudinally reciprocating elongated slats joined together to one drive means for simultaneous movement, and second alternating laterally spaced, longitudinal reciprocating elongated slats joined together to a second drive means for simultaneous movement independently of the first slats, and a permanently fixed, elongated slat interposed between said first and second reciprocating slats, whereby all first and second reciprocating slats may be moved simultaneously together in a load conveying direction by operating both drives, and said first or second movable slats may be retracted in the opposite direction while said second or first slats, respectively, remain stationary, and hence a load remains stationary by being supported upon the fixed slats and one or the other of the stationary first or second movable slats while the other movable slats are retracting.

It is by virtue of the foregoing basic concept that the principal objective of this invention is achieved; namely, the provision of a slat type reciprocating conveyor which requires only two sets of reciprocating conveyors to conveys material in one direction without moving the material in the reverse direction during the retraction operation of the reciprocating slats in the operating cycle of the apparatus.

Another important object of this invention is to provide a reciprocating conveyor of the class described in which the drive mechanism of the conveyor comprises only two drive means and the drive means are of commercially available components requiring minimum cost.

Still another object of this invention is the provision of a reciprocating conveyor of the class described which may be utilized as providing a truck bed capable of operation to load material onto a truck and to unload material from the truck as well as a conveyor that may be utilized in conventional industrial conveyor applications.

A further object of this invention is the provision of a reciprocating conveyor of the class described which overcomes the limitations and disadvantages of reciprocating conveyors of the prior art.

A still further object of this invention is the provision of a reciprocating conveyor of the class described which is of simplified construction for economical manufacture, reliability of operation and ease of maintenance.

The foregoing and other objects and advantages of this invention will appear from the following detailed description, taken in connection with the accompanying drawings of a preferred embodiment.

DESCRIPTION OF THE PREFERRED EMBODIMENT

The reciprocating conveyor of this invention can be utilized in a number of various industrial applications, such as elongated delivery conveyors or as truck beds to facilitate movement of material onto and off of a truck. Regardless of its application however, the conveyor is supoorted by a framework which includes longitudinally spaced, laterally extending support beams 10 that may mount opposite, fixed side walls 12 as needed or desired. The support beams 10 are embodied herein as I beams, and are spaced apart as needed along the length of the conveyor bed.

A plurality of longitudinally extending fixed slats 14 are secured to the support beams 10 in laterally spaced apart positions across the width of the conveyor, the slats extending the length of the conveyor bed. The longitudinally extending spaces formed between the fixed slats 14 receive first and second reciprocative slats 16, 18 arranged for longitudinal sliding movement in both directions between the opposite longitudinal ends of the conveyor. In the embodiment illustrated, the fixed slats 14 are provided with lateral extensions configured to afford mounting for slat connectors in the form of combination bearings and retainers for the reciprocating slats 16, 18 as will now be described.

Figure 2:
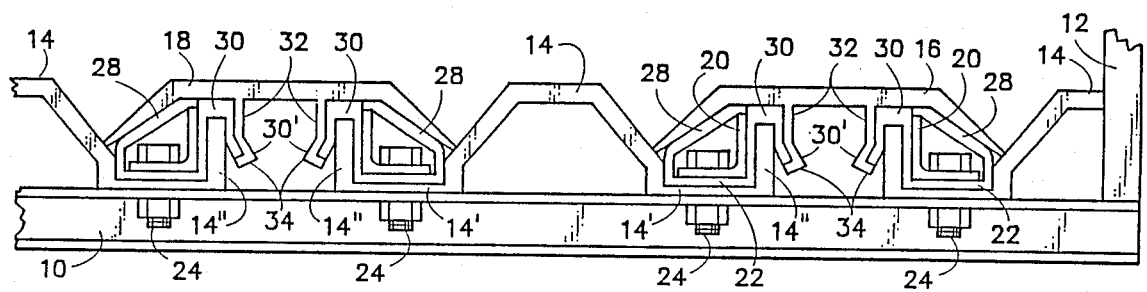
FIG. 2 is a fragmentary end view on an enlarged scale of the conveyor of FIG. 1 illustrating a portion of the novel, simplified construction of the conveyor bed and its support structure.

FIG. 2 best illustrates the mounting arrangement for the moving slats of the conveyor of this invention. As shown, each fixed slat 14 is configured with laterally extending horizontal end members 14' having upwardly projecting terminal ends 14''. A slat connector (FIG. 3) is configured to be disposed within the groove defined by the members 14' and 14" as shown, and an angle iron 20 overlies an intermediate portion 22 of the connector in the groove to reinforce its attachment therein. Aligned bores (not shown) extend through the angle iron 20, the intermediate portion 22, the slat end member 14' and the support beam 10 in order that a bolt 24 may releasably secure each assembly in place on each support beam.

Figure 3:
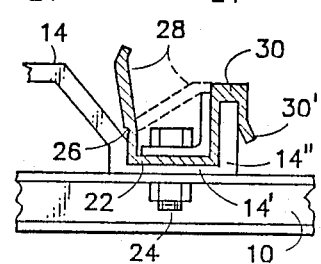
FIG. 3 is a fragmentary end view of a bearing mount for the reciprocating slats of the conveyor of this invention, the broken lines indicating the installed, operative position of the bearing mount prior to installation of a reciprocating slat thereon.

As will be apparent in examining FIG. 2 and FIG. 3, the slat connector embodied herein is best manufactured by extrusion of a plastic resin having a low coefficient of friction and in the shape seen in solid lines in FIG. 3. It preferably includes the notch 26 positioned to permit the projecting bearing portion 28 to be folded down into the angular configuration shown in broken lines in FIG. 3. In this position, the bearing portion 28 provides an angular supporting bearing surface for the outer, tapered edges of the reciprocating slats 16, 18.

The connector also includes an opposite end segment 30 of generally inverted U shape which is mounted on the upstanding terminal end 14". The upper closed portion of the end segment 30 forms a bearing support for a reciprocative slat 16 or 18 and the outer, downwardly extending angular end portion 30' forms a guide for the reciprocative slat. For this purpose, the reciprocative slat is provided with a pair of downwardly extending guide webs 32 which match the shape of the angular end portions.

Locking tabs 34 on the lower ends of the webs 32 of reciprocating slats 16, 18 are provided to underlie the lower ends of the angular end portions 30' and thereby secure the reciprocative slat against upward displacement. Thus attachment is achieved by pressing downward on the slat to force the tabs 34 past the resilient angular end portions 30', whereupon the latter spring back to overlie the tabs 34.

As seen in FIG. 3, the fixed slats 14 and the reciprocating slats 16, 18 all are configured so that their upper surfaces are disposed at the same height, thus forming a substantially level bed surface upon which material may be disposed. It is also seen that the width of the upper, material-supporting surface of the fixed slats 14 is configured to be less than the width of the upper surface of the reciprocating slats 16 and 18. The purpose of this feature of construction will be explained in detail later.

With reference again to FIG. 1 of the drawings, each first reciprocating slat 16 is secured by a connector 36 to a common drive link means illustrated herein as a transverse connecting drive beam 38. The other reciprocating slats, second slats 18, are similarly connected to each other through a second connector 40 to a common transverse connecting drive beam 42. Thus, simultaneous movement of all of the first slats 16 in both directions is permitted independently of the simultaneous movement of the second reciprocating slats 18, and vice versa.

Drive means, illustrated herein as a pair of double acting hydraulic cylinders 44 and 46 are each mounted at one end to a fixed part of the framework such as one of the lateral support beams 10. The opposite ends of the hydraulic cylinders are connected to the respective drive beams. Thus hydraulic cylinder 44 is connected to drive beam 38 and hydraulic cylinder 46 is connected to drive beam 42. Accordingly, extension or retraction of the piston cylinder 44 moves all first reciprocating slat 16 uniformly and simultaneously in one longitudinal direction or the other, and similar independent operation of the other hydraulic cylinder 46 results in the uniform, simultaneous movement of the second reciprocating slats 18 in one direction of the other.

Interposed between adjacent moving slats 16 and 18 is a fixed slat 14 which does not move at any time. The conveyor thus described may then be configured as wide as desired simply by utilizing additional reciprocating slats 16, 18 and fixed slats 14 as may be necessary, with all additional slats 16 and 18 being connected to the corresponding one of two hydraulic cylinders 44 and 46 through the associated transverse drive beams 38 and 42.

Figure 1:
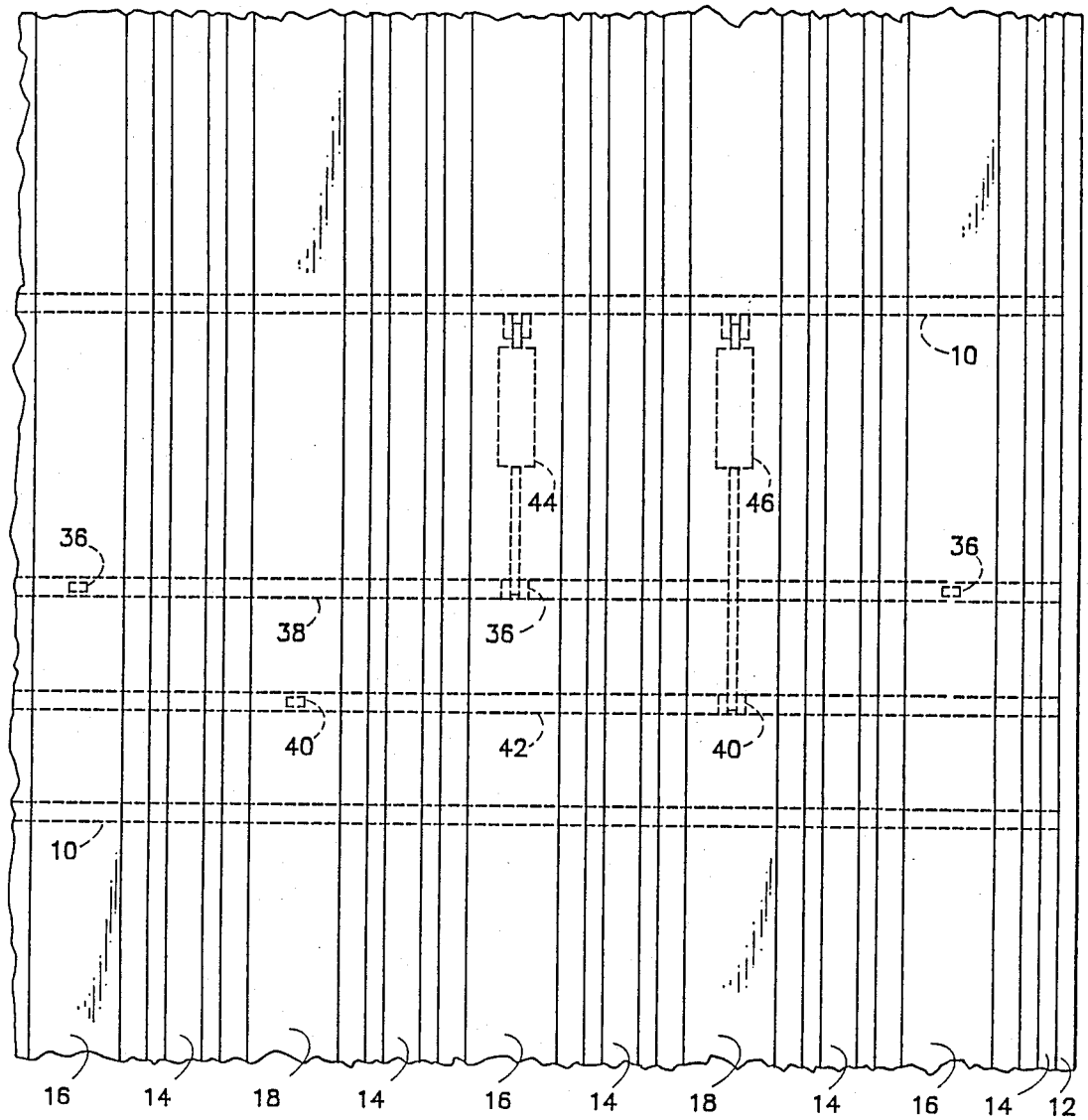
FIG. 1 is a fragmentary schematic plan view of a portion of a reciprocating conveyor system embodying the features of this invention, parts otherwise hidden being shown in broken lines.

Thus, with a load such as a box (not shown) disposed on the conveyor bed at the onfeed end thereof, for example the bottom in FIG. 1, the operation of the conveyor of this invention is as follows: First, the hydraulic cylinders 44 and 46 are both operated together to retract the pistons, simultaneously moving the drive beams 38 and 42, and hence all reciprocating slats, toward the top in FIG. 1. Because the surface area of the reciprocating slats 16 and 18 against the box is significantly greater than the surface area of the fixed slats 14 against the box, the friction of the box against the fixed slats is not great enough to prevent it from moving with the moving slats, and hence the box is carried forward.

When the retract stroke of the cylinders is completed, the fluid flow of one cylinder, for example 44, is reversed, and its piston is fully extended, moving all of the slats 16 in the opposite direction (toward the bottom in FIG. 1) while the fixed slats 14 and the reciprocating slats 18 remain stationary. Because the combined surface area of the unmoving slats 14 and 18 against the box is greater than the surface area of the moving slats 16, the friction of the box against the unmoving slats prevents the box from moving rearward as the slats 16 move rearward. Once the slats 16 are fully retracted, they remain stationary with the slats 14 as the slats 18 then are retracted. The box doesn't move rearward for the same reason just detailed above.

Once the slats 18 are retracted, the cylinders are again operated in unison to move all reciprocating slats 16 and 18 uniformly forward. The cycle just described repeats continuously to move the box from the onfeed end of the conveyor to the outfeed end.

Accordingly, it is seen that the present invention provides a conveyor which utilizes a much simplified construction that requires only two power sources and two sets of reciprocating slats to accomplish a completely satisfactory conveying of material. The system requires only the longitudinal sliding movement of the two sets of reciprocating slats, while eliminating all backward movement of material being transported by the conveyor.

It is also apparent that the conveyor of this invention may include various structural changes as alternatives for parts shown in the preferred embodiment. For example, although double acting hydraulic cylinders as drive means are preferred for their simplicity and efficiency, other conventional drives may be used to engage the two drive beams 38 and 42 for independent movement forward and backward. Also, as an alternative to the addition of more rows of reciprocating and stationary slats to increase the width of the conveyor, the slats may be configured wider in order to maintain a minimum number of bed slats required for a desired use.

Further, although the slat support, mounting and bearing assemblies illustrated are preferred for their simplicity, strength and reliability, various other conveyor applications may require alternative assemblies arranged to be more specifically suited to particular needs, while still providing the basic construction of the reciprocating slat conveyor of this invention capable of operating in the manner just disclosed.

Still further, although the fixed and reciprocative slats may be made in a variety of ways from a variety of materials, it is preferred for simplicity and minimum cost that they be made by the extrusion of aluminum or other suitably extrudable material.

From the foregoing therefore, it will be understood that the present invention provides a reciprocating slat type conveyor that, by virtue of its novel construction, utilizes a greatly simplified bed construction, drive means and linkages operating in a simple manner to provide a conveying of material without wasted movements of the material during the conveying operation and with minimum power. It is also understood that various changes, other than those already discussed, may be made in the size, shape, type, number and arrangement of parts described hereinbefore, without departing from the spirit of this invention and the scope of the appended claims.

Having thus described my invention and the manner in which it may be used, I claim:

1. A slat type reciprocating conveyor, comprising:
   (a) an elongated framework,
   (b) at least one longitudinally extending elongated load engaging fixed slat secured to the framework and extending the desired length of a conveyor bed,
   (c) first and second longitudinally slidable elongated load engaging reciprocative slats disposed on opposite lateral sides of and parallel to the longitudinally extending fixed slats, each of the fixed and reciprocative slats having a longitudinally extending load engaging surface, the load engaging surfaces of the fixed and reciprocative slats being in the same longitudinally extending plane at all times during operation of the conveyor,
   (d) bearing means on the framework for supporting the reciprocative slats for longitudinal sliding movement relative to the fixed slats,
   (e) lock means interengaging the framework and reciprocative slats for securing the reciprocative slats against vertical displacement relative to the fixed slat, and
   (f) first and second drive means on the framework connected to said first and second reciprocative slats, respectively, for moving the first and second slats longitudinally simultaneously in a load-conveying direction and independently of each other in the opposite, slat-retracting direction.

2. The reciprocating conveyor of claim 1 including a plurality of longitudinally extending fixed slats positioned in laterally spaced apart condition across the framework, and a reciprocative slat interposed between each said fixed slat, the reciprocative slats being designated first and second slats in alternating fashion across the width of the conveyor, each said first reciprocative slat being connected to said first drive means, and each said second reciprocative slat being connected to said second drive means.

3. The reciprocating conveyor of claim 2 wherein each first reciprocative slat is connected to a common first drive member which in turn is connected to said first drive means, and each said second reciprocative slat is connected to a common second drive member which in turn is connected to said second drive means, whereby operation of either drive means moves the reciprocative slats connected thereto.

4. The reciprocating conveyor of claim 1 wherein said first and second drive means each comprises a double acting piston cylinder, each operable independently of the other for simultaneous movement in a load-conveying direction and for alternate movement in the opposite, slat-retracting direction.

5. The reciprocating conveyor of claim 1 wherein the width of the upper material supporting surface of said at least one fixed slat is less than the width of the upper material supporting surface of each reciprocative slat.

6. The reciprocating conveyor of claim 1 wherein said bearing means is of a material of low coefficient of friction.

7. The reciprocating conveyor of claim 1 wherein the lock means includes a resilient member integral with the bearing means, and locking tab means on each reciprocative slat is configured to engage the lock means, whereby to prevent upward displacement of the reciprocative salt.

8. The reciprocating conveyor of claim 7 including a lateral extension of each fixed slat supporting the bearing means and integral resilient member.

* * * * *